Oct. 21, 1958     J. R. ERWIN     2,857,094
INTEGRAL PLASTIC ROTORS

Filed July 19, 1955     2 Sheets-Sheet 1

INVENTOR
JOHN R. ERWIN
BY
ATTORNEYS

Oct. 21, 1958  J. R. ERWIN  2,857,094
INTEGRAL PLASTIC ROTORS
Filed July 19, 1955  2 Sheets-Sheet 2

INVENTOR
JOHN R. ERWIN
BY
R. J. Tompkins
ATTORNEYS

United States Patent Office 2,857,094
Patented Oct. 21, 1958

2,857,094

INTEGRAL PLASTIC ROTORS

John R. Erwin, Hampton, Va.

Application July 19, 1955, Serial No. 523,129

8 Claims. (Cl. 230—134)

(Granted under Title 35, U. S. Code (1952), sec. 266)

The invention described herein may be manufactured and used by or for the Government of the United States of America for governmental purposes without the payment of any royalties thereon or therefor.

The present invention relates to a method of constructing integrally formed plastic rotors and to the product of such method, that is, to integrally formed rotors for use in compressors or the like and in which the blades thereof are reinforced by bundles of high strength filaments such, for example, as those formed of glass fibers, pairs of blades being molded on opposed ends of bundles of glass fibers which pass through and are resin bonded in the hub portion of the rotor. This structure permits replacement of imperfect blades during molding of the blades prior to molding the hub portion. In using this method of construction a rotor formed of plastic materials is provided wherein the hub and blades are integrally formed, and having a strength-weight ratio heretofore obtainable only in forged metals. The method of the present invention is readily adaptable with slight modification to either an even or uneven number of blades.

In the prior art, integral hub and blade construction was accomplished by machining the complete rotor from a solid piece of stock or by casting the rotor in one piece. Disadvantages of casting an integral rotor lie in the poor mechanical properties of casting alloys and the complicated mold required. The disadvantages of machining an integral rotor from one piece of stock are the time required, the high cost, and the waste of material. Further, many high-strength materials cannot be machined. Another important disadvantage is that an error in forming one blade destroys the usefulness of the entire rotor.

An object of the present invention is to provide a new and improved method of constructing an integral rotor wherein high strength reinforcing fibers are positioned in a manner to resist to a high degree centrifugal forces.

Another object is to provide a new and improved method of constructing an integral rotor wherein imperfectly formed blades may be replaced during assembly thereof.

Still another object is to provide a new and improved method of constructing an integral plastic bonded rotor wherein high strength reinforcing fibers in filamentary form are positioned in a manner to resist to a high degree centrifugal forces due to rotation while foamed materials are employed to fill voids therein and to provide compressive strength.

A further object is to provide a new and improved integral rotor of plastic bonded glass fiber construction and wherein the glass fibers are arranged to provide a high resistance to centrifugal force.

Other objects and many of the attendant advantages of this invention will be readily appreciated as the same becomes better understood by reference to the following detailed description when considered in connection with the accompanying drawings wherein.

Figure 1:
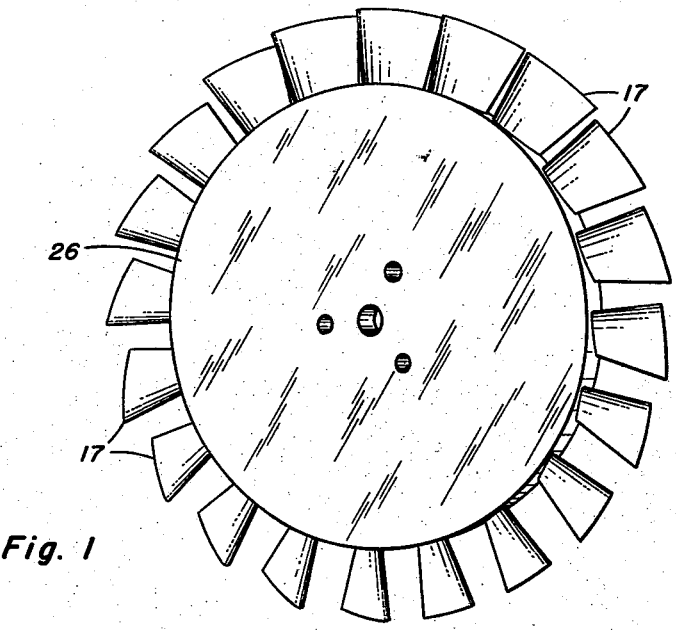
Fig. 1 is a perspective view of an integral plastic rotor constructed in accordance with the method of the present invention.

Referring more particularly to the drawings wherein like numerals indicate like parts throughout the several views, 10 indicates generally a jig suitable for use in the method of the present invention and which includes a disc member 11 and a peripheral ring comprising a pair of semicircular sections 12 and 13. Spaced from ring sections 12 and 13 toward the axis of disc 11 are members 14.

In performing the steps of the method of the present invention, a predetermined number of fiber strands, each of which is made up of a plurality of individual filaments of glass fiber or other high strength material in the form of twisted yarn, woven strings, or untwisted and unwoven filaments known as roving, is cut to a predetermined length and temporarily joined at the ends thereof. The foregoing described strands which are indicated at 15 form a bundle indicated generally at 16. A blade 17 is formed on each bundle 16 by placing one end of each bundle in a female mold (not shown) of suitable shape and impregnating the fibers thereof with a suitable bonding resin. If desired, the blades may be processed by additional molding or coating to produce blades having the required dimensional accuracy and surface finish. Prior to molding and impregnating, the end portion of each bundle of fibers 16 may be enclosed with a wrapping of woven fabric 18 of a material similar to that of the bundles 16 or of any suitable material. The process of forming each blade 17 is repeated until half of the total number of rotor blades is completed. These blades will hereafter be called the preformed blades. The jig 10 is arranged to hold each blade 17 at the desired angle and radius, the outer edge of each blade being brought against the inner peripheral surface of one of the sections 12 or 13. Fixedly mounted on the inner surface of sections 12 and 13 are blocks 19 positioned to firmly hold blades 17 at a desired angle. The blocks 19 may be releasably secured to ring sections 12 and 13 in order to facilitate the removal of the finished rotor from jig 10.

Figure 2:
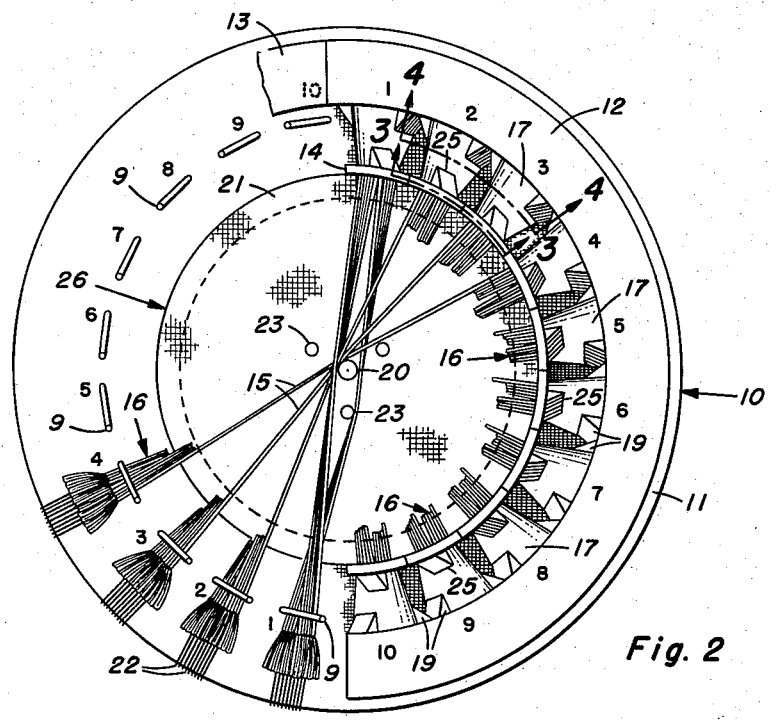
Fig. 2 is a plan view of a jig suitable for use with the method of the present invention and showing preformed blades on one end of each of the bundles of glass fibers.
Figure 3:
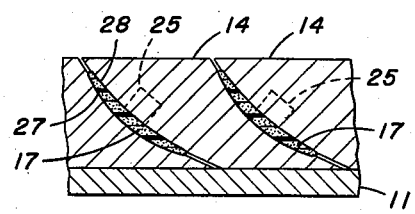
Fig. 3 is a sectional view taken along the line 3—3 of Fig. 2.
Figure 4:
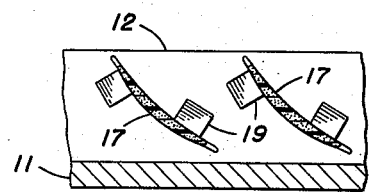
Fig. 4 is a sectional view taken along the line 4—4 of Fig. 2.
Figure 5:
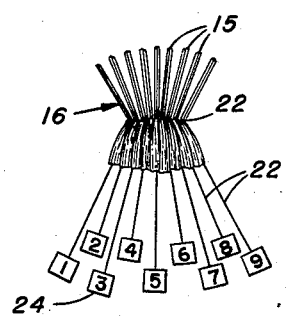
Fig. 5 is a detail elevation of the end of a bundle of strands opposite to the end having a preformed blade thereon and showing the strings and identifying tags thereon.

Prior to setting up blades 17, a preformed resin impregnated disc 21 reinforced by glass cloth or other suitable material is placed in the center portion of disc member 11 as shown in Fig. 2.

Preferably blades 17 are placed in jig 10 with the leading edge down and the strand 15 from the leading edge of the blade, for example, in No. 1 position as indicated on section 12 of Fig. 2, is drawn across the member 11 to a station which is diametrically opposite thereto, each station having a removable guide pin 9 set at substantially the desired angle of the blades. The strand for the leading edge of each succeeding blade is drawn across member 11 to the station diametrically opposite to the preformed blade to which it is joined. Each such station may be numbered to agree with the preformed blade station. It is to be understood that the strands cross each other at substantially the center of the jig 10.

As shown in Fig. 2, each strand is tied by a string 22, the string carrying, if desired, a numbered tag 24 for easy identification of the strands and to assist in positioning the strands in desired order. These strings may also be used to apply light tension to each strand. Each of the strands 15 preferably contains approximately the same number of fibers or filaments. If desired, however, strands which are imbedded in the thin sections of the blades such as the trailing edges thereof may contain fewer fibers.

After all of the leading strands of the preformed blades are in the desired positions, the second strand of each blade is drawn across the member 11 in the same manner as heretofore described for the leading strand. Thereafter each succeeding strand of each blade, in sequence, is drawn in like manner. It is to be understood that the strands are drawn across to a diametrically opposite point in as near to a straight line as possible.

A center pin 20 is mounted at the axis of disc member 11 and has a plurality of pins 23 spaced radially therefrom and mounted in disc member 11. These pins extend through the hub portion 26 of the rotor during the molding operation and form, in the molded material, holes through which bolts or other attaching means may be placed in the finished rotor. As shown in Fig. 2 the strands 15 are passed between the aforementioned pins with as little deviation from a straight line as possible, as has been before stated.

When all of the bundles of strands have been drawn across member 11, the members 14 being in place at the base of each of the preformed blades to confine the bonding resin for the hub 26 of the rotor, the ends of the strands of one of the bundles are arranged in the blade forming mold in the same order as in the preformed blade at the opposite end of the bundle, in other words, the strand of fibers formed in the preformed blade at the leading edge thereof is positioned in the leading edge portion of the mold during the forming of the blade at the opposite end. In like manner each strand is placed at one end thereof in the mold for forming the new blade in the same relative position it occupies at the other end thereof in the preformed blade. In order to ensure proper placement of the strands in the mold each strand is arranged as heretofore described by using the numbered tags 24, the strands being numbered consecutively from the leading edge of the blade to the trailing edge or in any convenient order.

As shown in Fig. 2 each of the members 14 is provided with a block 25 similar to the blocks 19 and for maintaining the blade associated therewith in desired position. Each of the members 14 is also provided with arcuately cut edges 27 and 28 which are adapted to abut the edges of the adjacent members 14 at the ends thereof and to receive the base of an associated blade therebetween.

As the blades are molded on the ends of the bundles of strands, members 14 are set in position thereby to completely enclose the periphery of the hub section and to assure the accurate positioning of the blades with respect to the hub 26.

Figures 6, 7, 8:
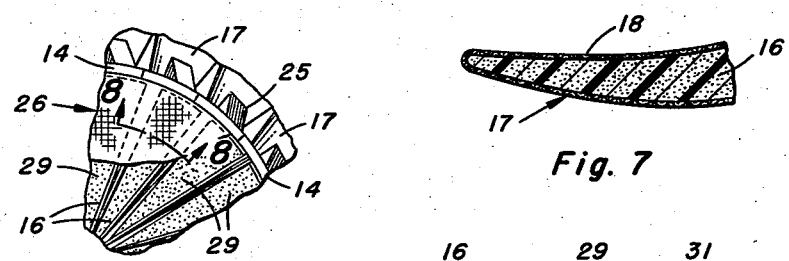
Fig. 6 is a fragmentary view of a portion of the jig of Fig. 2 and showing spacers mounted between the bundles of strands.
Fig. 7 is a detail sectional view of one of the blades and showing the fabric reinforcing thereof.
Fig. 8 is a sectional view taken along line 8—8 of Fig. 6.

At this point in the forming of the rotor, the construction exhibits a hub portion having the center thereof densely packed with crossed strands of fibers while at the periphery thereof the construction is relatively open except for where the strands emerge from the base of the blades 17. These spaces or voids may be filled with preformed foam plastic spacers 29 as shown in Fig. 6. Alternatively the spaces may be filled with a composition which will form a foam plastic after being placed in the jig. It also may be desirable to employ as a filter for the voids a prefabricated hollow insert formed of a material capable of withstanding the torsion, compression, and tension loads encountered in such use. With the inserts in place, the hub portion defined by the members 14 is filled with a bonding resin after which a second disc of preformed resin impregnated glass cloth 31 is placed over the bonding resin contained in the hub portion and bonded thereto. It will thus be seen that a hub portion 26 is formed for the rotor through which the bundles 16 of reinforcing material pass and containing the foam plastic spacers 29, all of which are impregnated with the bonding resin and having the pair of discs 21 and 31 of reinforced plastic bonded to the plane surfaces of the hub.

An advantage of employing the foregoing method is that imperfectly formed blades may be discarded prior to molding the hub portion without discarding the rest of the assembly. For instance, if an imperfect blade is formed on one of the bundles 16 after the strands 15 thereof have been threaded through the pile-up of strands in the hub portion, the blade at one end of the strands is cut off and the strands of a new preformed blade are secured in the same order as heretofore described to the strands remaining in the jig, whereupon the old blade at the other end of the strands is pulled, drawing the new strands through the pile-up of strands in the same order as before. Thereafter when the old strands have been disconnected from the newly added strands, a new blade is formed thereon.

Figure 9:
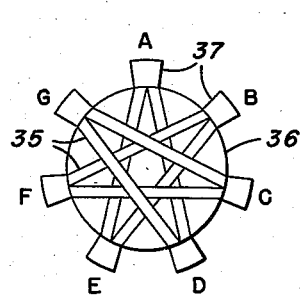
Fig. 9 is a diagrammatic view showing a slight modification of the arrangement of the reinforcing strands.

The method heretofore described is particularly adaptable to rotors having an even number of blades. If it is desired to provide a rotor with an uneven number of blades, half the total number of blades minus one are preformed on the bundles of strands in the usual manner and placed around a suitable jig. In this case, the strands of each preformed blade are not run to a diametrically opposed point across the rotor, but are equally divided between the two blades to be formed on either side of the diametrically opposite point. As shown in Fig. 9, which is a diagram showing the arrangement of strands 35 which are similar to strands 15 of the preferred form of the invention, there are provided stations A through G equidistantly spaced around a hub portion 36 and having blades 37 extended radially therefrom. The strands of the preformed blade in station A are divided equally and are passed across the hub portion 36 to stations D and E.

The strands of the blade in station B are passed to stations E and F, while the strands from station C are passed to stations F and G. A half bundle of strands is passed from station D to station G. It will thus be seen that the blades at stations A, B and C may be preformed with the strands formed therein and thereafter blades at E and F stations may be formed on the ends half bundles of strands from stations A and B for E and B and C for F. Lastly blades are formed at stations D and G employing half bundles of the strands from C for G and half bundles of the strands from A for D together with a half bundle of strands passing directly from D to G. While the diagram of Fig. 9 shows seven blades it is, of course, understood that any uneven number of blades may be employed by using the same system.

Obviously many modifications and variations of the present invention are possible in the light of the above teachings. It is therefore to be understood that within the scope of the appended claims the invention may be practiced otherwise than as specifically described.

What is claimed is:

1. The method of integrally forming a bladed rotor comprising the steps of molding a first plurality of blades about the ends of a plurality of strands of reinforcing material, setting said first plurality of blades substantially half way around a circular jig, passing said strands across the jig to positions substantially opposite to the positions of said blades, molding a second plurality of blades about the other ends of said plurality of strands of reinforcing material, setting said second plurality of blades around said circular jig to complete the circle, and molding a hub portion of said rotor in an enclosed area bounded by the inner ends of said first and second blades.

2. The method of integrally forming a bladed rotor comprising the steps of, molding a first blade on one end portion of each of a plurality of bundles of stranded reinforcing material, setting said molded blades in desired positions approximately half way around a circular jig, passing each of said bundles across said jig to a position diametrically opposite the associated blade, molding a second blade on the other end portion of each of the bundles, and molding a hub portion enclosing the strands between said diametrically opposed blades.

3. The method of integrally forming a bladed rotor comprising the steps of, molding a first blade on one end portion of a bundle of reinforcing material, setting said blade in desired position on one side of a jig, passing said bundle across said jig to a position substantially diametrically opposite said first blade, molding a second blade on the other end of said bundle, erecting a barrier to form a mold between said first and second blades, filling said mold with a bonding resin and simultaneously therewith impregnating the reinforcing material passing therethrough.

4. The method of integrally forming a bladed rotor comprising the steps of molding a sufficient number of blades on the ends of bundles of reinforcing fibers to extend approximately half way around the hub of said rotor, setting said molded blades in semicircular arrangement in a suitable jig, extending each of said bundles of reinforcing fibers across said jig to a position diametrically opposite the blade individual thereto, arranging said fibers in substantially the same order as in said molded blades at each of said diametrically opposite positions, placing said fibers under light tension, molding blades on said bundles at said diametrically opposite points, erecting a wall adjacent the inner ends of the blades, and molding within said wall a resin hub portion for said blades and simultaneously therewith impregnating said fibers extending between the blades with said resin.

5. The method of integrally forming a rotor having an uneven number of blades comprising the steps of molding a first plurality of blades on the one end of a plurality of strands of reinforcing material, dividing the strands of each blade into two equal portions, setting said plurality of blades in the form of a semicircle, extending said divided strands of each of said blades angularly to positions on both sides of a point diametrically opposite to the blade attached thereto, molding a second plurality of blades each of which receives one portion of the divided strands from each of two of said first plurality of blades, molding a third pair of blades about divided strands from two of said first plurality of blades and other strands from one of said third blades to the other blade thereof, and molding a hub portion for said blades and simultaneously therewith impregnating the fiber strands passing therethrough.

6. An integral bladed rotor comprising, a plurality of bundles of high strength reinforcing filaments, a blade secured to and individual to opposite ends of each of said bundles, a hub portion, said blades being anchored in and extending beyond said hub portion at diametrically opposite points, said bundles of filaments passing through said hub portion in substantially a straight line and in said hub portion.

7. An integrally formed bladed rotor comprising, a first plurality of blades for said rotor, a second plurality of blades for said rotor, each of said plurality of blades being arranged in a semicircle about a common axis, a plurality of reinforcing strands formed at the ends thereof in said first and second pluralities of blades, the strands of said first plurality of blades extending to said second plurality of blades, and a hub portion formed integrally with the inner ends of said blades, said reinforcing strands passing through said hub portion and formed integrally therewith.

8. An integral bladed rotor comprising, a plurality of bundles of high strength reinforcing filaments, pairs of blades secured to and individual to opposite ends of each of said bundles, a hub portion, each pair of said blades extending beyond the periphery of said hub portion at diametrically opposite points, each of said bundles passing through said hub portion in substantially a straight line from one of each of said pairs of blades to the other of each of said pairs of blades in said hub portion.

References Cited in the file of this patent

UNITED STATES PATENTS

| | | |
|---|---|---|
| 1,433,728 | Kemp | Oct. 31, 1922 |
| 1,537,790 | Alpe | May 12, 1925 |
| 1,605,356 | Leipert | Nov. 2, 1926 |
| 2,588,570 | Pitcairn | Mar. 11, 1952 |
| 2,618,462 | Kane | Nov. 18, 1952 |

FOREIGN PATENTS

| | | |
|---|---|---|
| 399,607 | Great Britain | Oct. 12, 1933 |